United States Patent [19]
Bjork

[11] 3,753,495
[45] Aug. 21, 1973

[54] WATER CONDITIONING UNIT
[75] Inventor: Gust H. Bjork, Robbinsdale, Minn.
[73] Assignee: Flickertail Industries, Inc., Linton, N. Dak.
[22] Filed: June 1, 1971
[21] Appl. No.: 148,376

[52] U.S. Cl. .................. 210/206, 210/288
[51] Int. Cl. ............... B01d 27/02, B01d 35/02
[58] Field of Search .............. 210/57, 205, 288, 210/206

[56] References Cited
UNITED STATES PATENTS

| | | | |
|---|---|---|---|
| 2,809,158 | 10/1957 | Yustick | 210/57 |
| 3,385,441 | 4/1968 | Lyall | 210/288 X |
| 3,469,696 | 9/1969 | Petrucci et al. | 210/57 X |
| 2,374,100 | 4/1945 | Jackson | 210/57 X |
| 2,539,305 | 1/1951 | Hatch | 210/57 |
| 3,126,427 | 3/1964 | Broughton | 210/57 X |

Primary Examiner—Samih N. Zaharna
Assistant Examiner—Robert H. Spitzer
Attorney—Burd, Braddock & Bartz

[57] ABSTRACT

A water conditioning unit for conditioning water to reduce its degree of hardness, to remove suspended impurities and for clarifying, deodorizing and the like. The unit has connections for installation in any water distribution system. It includes a first filtering tank of granular carbonaceous material and an auxiliary tank of water softening chemical. Interconnections provide for diversion of water to the chemical tank and metering of the chemical solution into the water being treated.

8 Claims, 3 Drawing Figures

PATENTED AUG 21 1973

3,753,495

INVENTOR.
GUST H. BJORK
BY
Burd, Braddock & Bartz
ATTORNEYS

WATER CONDITIONING UNIT

This invention relates to a unit for treating water to condition the same by purifying, deodorizing and reducing the hardness of the water. The unit is compact, simple in construction, economical to install and to operate. Unlike most conventional water conditioning units, it requires no electricity, no switches, no timers or the like; it requires recharging at widely spaced intervals to replenish the chemical supply, but it requires no regeneration.

The invention is illustrated by the accompanying drawings in which the same numerals are used to identify corresponding parts and in which.

Figure 1:
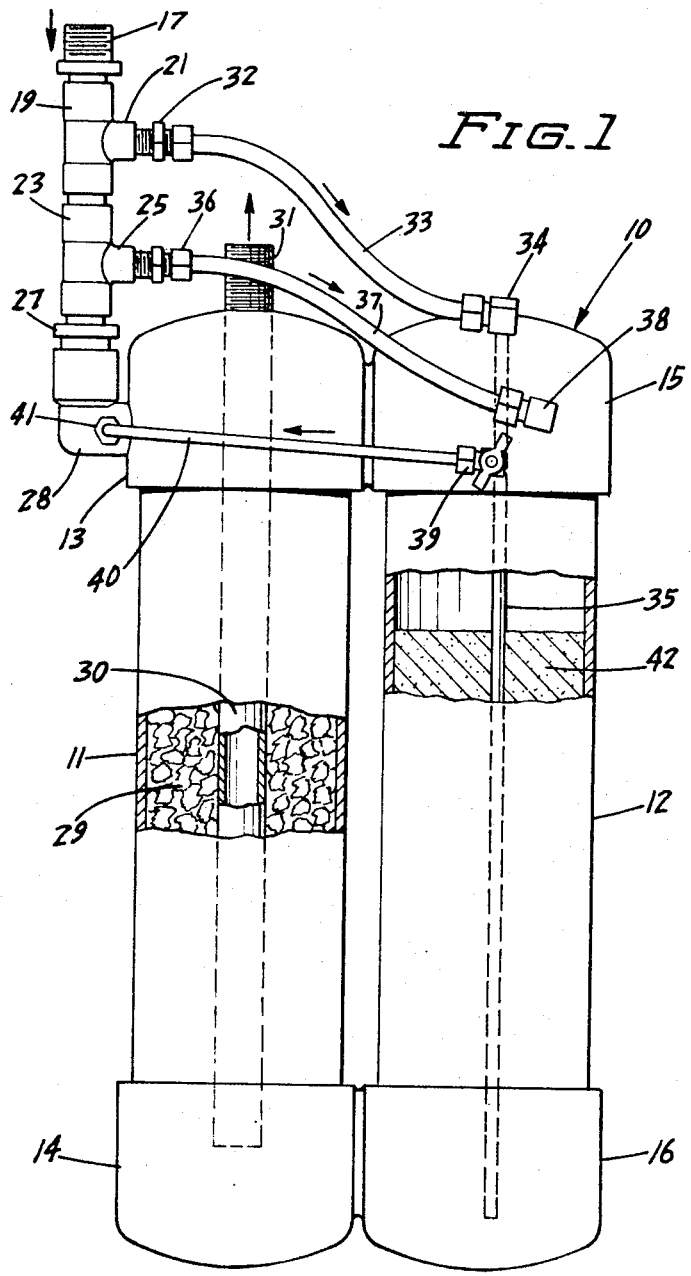
FIG. 1 is an elevation of an assembled water conditioning unit ready for installation in any water supply and distribution system.
Figure 3:
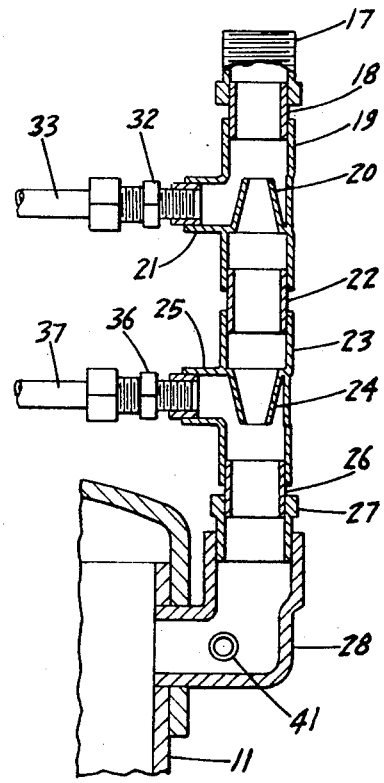
FIG. 3 is a fragmentary vertical section on an enlarged scale on the line 3—3 of FIG. 2 and in the direction of the arrows.
Figure 2:
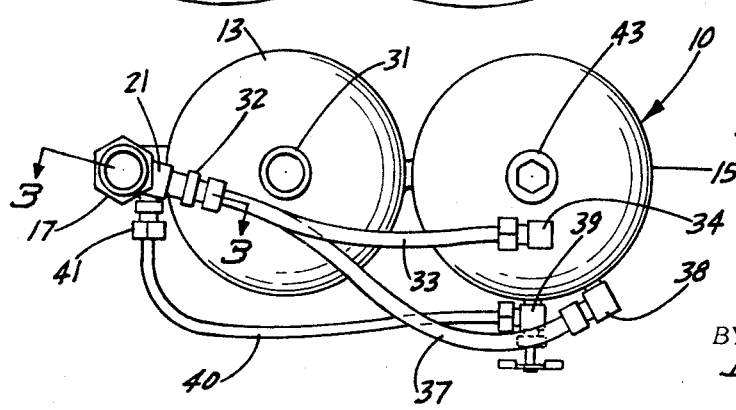
FIG. 2 is a top plan view.

Referring now to the drawings, the water conditioning unit, indicated generally at 10, comprises a first vertically disposed tank 11 and a second tank 12 of substantially the same size and shape disposed in generally side-by-side parallel relationship. Tanks 11 and 12 are elongated and tubular, preferably formed from a relatively lightweight inert substance such as 4 to 5 inch diameter polyvinyl chloride tubing and having top and bottom cap members 13 and 14, and 15 and 16, respectively, secured adhesively or otherwise in water-tight connections to the ends of the tubing.

Tank 11 is connected to a supply line of a residential or commercial water distribution system so as to receive water under pressure from a municipal water supply, a well, reservoir or storage tank, or the like, as follows. A coupling 17, adapted for connection to the water supply line, is connected by means of a sleeve 18 to a tee fitting 19. Fitting 19 includes an internal venturi-type diverter element 20 in the form of an open-ended truncated cone whose base engages the inside wall of fitting 19 and which is disposed adjacent the lateral opening 21 of the tee fitting. This functions to divert part of the supply line flow through lateral outlet 21 to tank 12, as described hereinafter.

Tee fitting 19 is connected in turn through sleeve 22 to a further tee fitting 23 having a diverter 24, (which is similar to that already described in tee fitting 19, except that it is inverted), disposed adjacent the lateral outlet 25 of tee fitting 23. Because of the downstream resistance to flow offered by tank 11, a smaller amount of the supply line water is diverted from fitting 23 to tank 12, as described hereinafter. Tee fitting 23 is connected through sleeve 26 and coupling 27 to an elbow 28 which enters the upper end of tank 11 through cap 13.

Tank 11 is substantially filled with carbonaceous material, such as activated charcoal, coke, or the like. Desirably the tank is filled with granulated coke of about one inch average particle size. The incoming water descends through the carbon bed 29 to the bottom of tank 11 and is discharged through vertical centrally disposed discharge pipe or tube 30 which extends through top cap 13 and is provided with a fitting 31 for connection to a water distribution system.

The lateral outlet 21 of tee fitting 19 is connected through fitting 32 and tubing 33 to fitting 34 which communicates through a port in top cap 15 of tank 12. The interior end of fitting 34 is connected to tube 35 which extends substantially to the bottom of tank 12. Lateral outlet 25 of tee fitting 23 is connected through fitting 36 and tube 37 to fitting 38 which extends through top cap 15 of tank 12 and communicates directly with the upper end of that tank. A needle valve 39 is likewise in direct fluid communication with the upper end of tank 12 and is connected through tube 40 and fitting 41 with elbow 28 for controlled metering of a small portion of the fluid contents of tank 12 into the water supply line, the amount depending upon the hardness of the water and being determined by adjustment of needle valve 39.

Tank 12 is filled between about two-thirds and three-fourths full with a bed 42 of a relatively low-solubility water softening and conditioning chemical. A plug 43 in a top opening in top cap 15 of tank 12 permits periodic replacement of the bed 42 of water softening mineral. In normal use, replenishment is at widely spaced intervals, between about six months and a year. A preferred water conditioning mineral is sodium tripolyphosphate, $Na_5P_3O_{10}$, (STPP), which functions to sequester calcium and magnesium hardness from water without precipitation. The solution of sodium tripolyphosphate in the top of tank 12 is maintained at about five per cent. For a household water system, when a valve in the water distribution system is open such that water is flowing through the conditioning system, valve 39 is adjusted to introduce the STPP solution at the rate of about one drop every 10 seconds, this rate of introduction being variable dependent upon the hardness of the water and the rate and volume of water flow. At this rate of introduction, in an ordinary household system, 2 pounds of STPP lasts about 1 year.

In operation of the unit, when a valve in the water distribution system is opened, water under pressure from a supply main is introduced into the unit through coupling 17. Water at main pressure is diverted through tee fitting 19 through tubes 33 and 35 to the bottom of tank 12 to dissolve part of the bed 42 of STPP and maintain a solution in the head of tank 12 at substantially main pressure. The principal flow from the supply main passes through tee fitting 19 into tee fitting 23 where a further smaller portion of the water is diverted through tubing 37 into the top of tank 12 to dilute the STPP solution and maintain it about five per cent concentration. The water from the supply main passes into tank 11 through elbow 28 where a small amount of the STPP solution is bled into the water supply through needle valve 39, tube 40 and fitting 41. The treated water passes to the bottom of tank 11 and upwardly and out through tube 30 and discharge fitting 31 into the water distribution system. The water is further treated by clarifying, deodorizing, decolorizing and filtering in its passage through the bed of coke.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A water conditioning unit comprising:
   A. means for connection to a source of water under pressure, B. a first vertically disposed tank in communication therewith, said first tank being substantially filled with granulated carbonaceous filtering material, and the upper end of said first tank being in direct fluid communication with said means for connection to a water source, C. means for connecting the lower end of said tank to a water distribution system, D. a second vertically disposed tank adapted to contain a bed of soluble water conditioning mineral, E. open-ended truncated conical venturi-type diverter means upstream from said first tank connected to said second tank for diverting water from said source to said second tank, the lower end of said second tank being in direct fluid communication with said diverter means, whereby the diverted water passes through the bed of water conditioning mineral, and F. tubular conduit means, including a needle valve located between said diverter means and said first tank adjacent to the downstream end of the diverter and connected to said second tank for metering solution from said second tank into the water from said source in its passage to said first tank, the upper end of said second tank being in direct fluid communication with said conduit and needle valve means for metering solution.

2. A water conditioning unit according to claim 1 further characterized in that said carbonaceous filtering material is coke of about one inch average particle size.

3. A water conditioning unit according to claim 1 further characterized in that said tank contains a bed of sodium tripolyphosphate.

4. A water conditioning unit according to claim 3 further characterized in that said bed occupies about two-thirds to three-fourths of the volume of the second tank.

5. A water conditioning unit according to claim 1 further characterized in that:

A. a second open-ended truncated conical venturi-type diverter means is provided downstream from said first diverter means and upstream from said means for metering solution from the second tank, and B. said second diverter means is in direct fluid communication with the upper end of said second tank.

6. A water conditioning unit comprising:

A. a vertically disposed tank adapted to contain a bed of soluble water conditioning mineral, B. means for connecting said tank to a water supply line connected to a source of water under pressure, the lower end of said tank being in direct fluid communication with said means for connection to the water supply line, whereby the water is adapted to pass upward through the bed of water conditioning material, C. means for connecting said tank to a water distribution line connected to a water distribution system, D. open ended truncated conical venturi-type flow restricting diverter means for diverting a portion of the water from said supply line to said tank and drawing dissolved water conditioning mineral from said tank to the water distribution line, said diverter means being between said water supply line and water distribution line in direct fluid communication therewith and between said means for connecting the tank to the water supply line and said means for connecting the tank to the water distribution line, and E. tubular conduit and needle valve metering means between said tank and distribution line for controlling flow from said tank to said distribution line, the upper end of said tank being in direct fluid communication with said means for metering solution and said tubular conduit communicating with said distribution line adjacent to and downstream from said diverter means.

7. A water conditioning unit according to claim 6 further characterized in that said tank contains a bed of sodium tripolyphosphate.

8. A water conditioning unit according to claim 7 further characterized in that said bed occupies about two-thirds to three-fourths of the volume of the tank.

* * * * *

PO-1050
(5/69)

UNITED STATES PATENT OFFICE
CERTIFICATE OF CORRECTION

Patent No. 3,753,495          Dated August 21, 1973

Inventor(s) Gust H. Bjork

It is certified that error appears in the above-identified patent and that said Letters Patent are hereby corrected as shown below:

On the title page, list of references cited,

"3,385,441   4/1968   Lyall ........ 210/288X" should be
--3,385,441   5/1968   Lyall ........ 210/288X--

Signed and sealed this 20th day of November 1973.

(SEAL)
Attest:

EDWARD M. FLETCHER, JR.        RENE D. TEGTMEYER
Attesting Officer              Acting Commissioner of Patents